(No Model.)
N. BARRY, Jr. & P. J. BARRY.
GREASE TRAP.
No. 492,261. Patented Feb. 21, 1893.
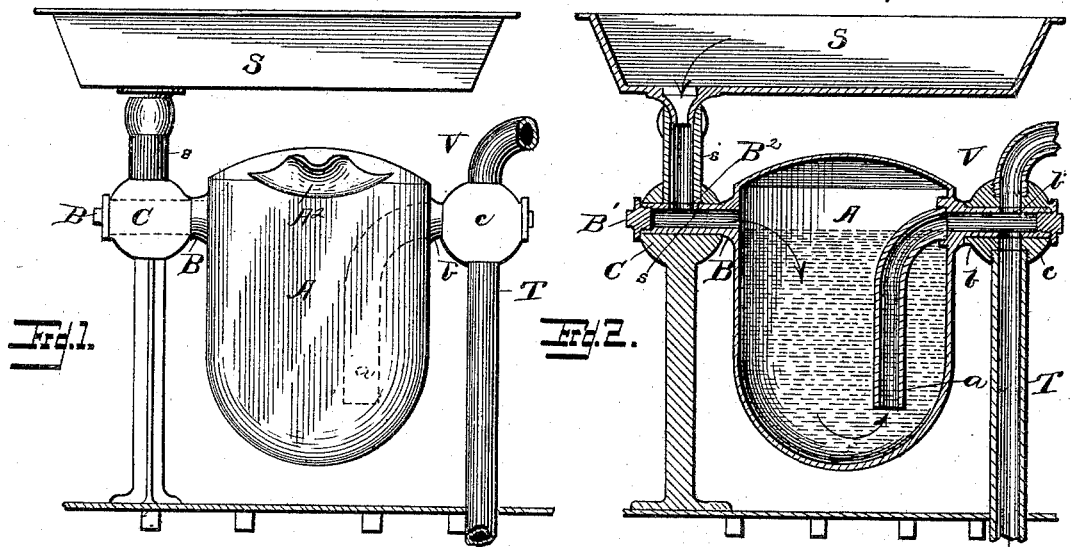
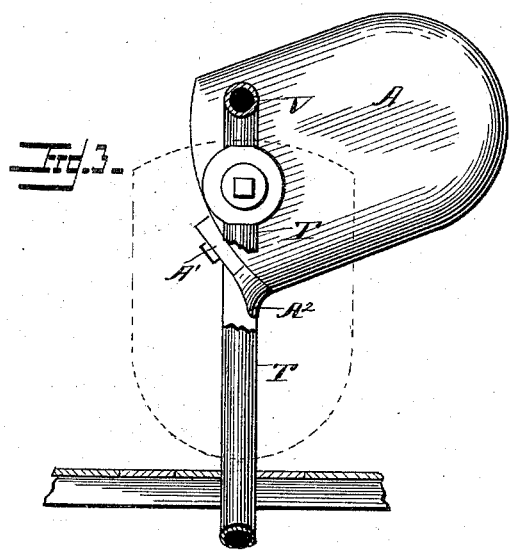
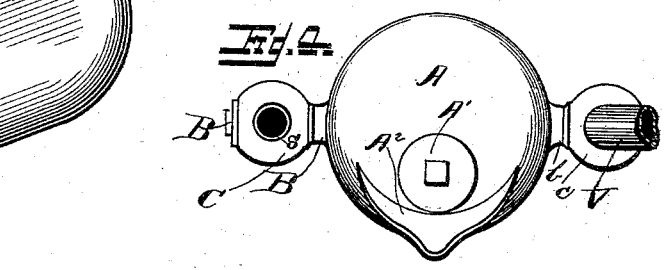
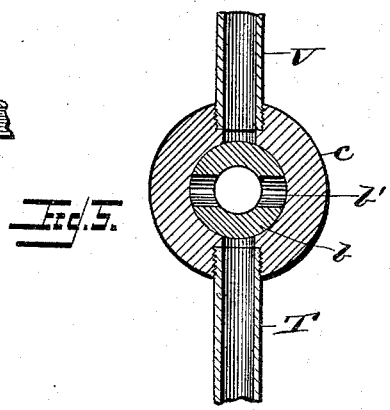
Witnesses:
J. M. Fowler Jr.
James R. Mansfield.
Inventors
N. Barry Jr.
P. J. Barry
By Alexander Dowell
Attorneys

UNITED STATES PATENT OFFICE.

NICHOLAS BARRY, JR., AND PATRICK J. BARRY, OF MUSCATINE, IOWA.

GREASE-TRAP.

SPECIFICATION forming part of Letters Patent No. 492,261, dated February 21, 1893.

Application filed May 2, 1892. Serial No. 431,570. (No model.)

*To all whom it may concern:*

Be it known that we, NICHOLAS BARRY, Jr., and PATRICK J. BARRY, of Muscatine, in the county of Muscatine and State of Iowa, have invented certain new and useful Improvements in Grease-Traps; and we do hereby declare that the following is a full, clear, and exact description thereof, reference being had to the accompanying drawings, and to the letters of reference marked thereon, which form part of this specification.

Our present invention is an improvement in plumbers' traps, especially designed for "grease traps" and its objects are to enable the trap to be readily cleaned without removing it from its position or disconnecting it from the pipes, and without the disagreeable hand work necessary in cleansing traps of this class as ordinarily constructed.

Further objects of the invention are to prevent the reflux of foul air &c., from the sewer pipes into the trap while the latter is being cleansed.

The invention consists in a novel water seal tilting trap having hollow trunnions or inlet and outlet pipes which are connected by packed or swing joints to the waste and sewer pipes, respectively, and so formed that the trap can be swung over or up so as to discharge its contents, and when so tilted will automatically close the inlet to the sewer pipe or both waste and sewer pipes if desired, and further in certain novel details of construction and combination of parts hereinafter described and claimed.

Referring to the drawings by letters; Figure 1 is a side elevation of our improved trap as connected to the waste and sewer pipes. Fig. 2 is a vertical sectional view through Fig. 1. Fig. 3 is a front view of the trap showing it tilted for emptying and cleansing, and by dotted lines in its normal position. Fig. 4 is a top view thereof. Fig. 5 is a detail sectional view of one of the trunnion joints.

A represents the trap formed of a hollow cylindrical body closed both at top and bottom and preferably rounded off at both ends as shown in Fig. 1 having in its top a large opening which is closed by a tightly fitting removable screw cap or plate A', this opening being a little to one side and around the lower edges of the opening is a flange or lip $A^2$ to prevent running of fluids over the trap when poured thereout.

B, b, are hollow trunnions or pipe joints fixed to the trap on opposite sides thereof and near its upper end. Trunnion B is journaled in a boxing C on the lower end of a waste pipe s leading from the sink S, the boxing is stuffed water tight around the trunnion and the outer end of the latter is closed by a cap B', trunnion B communicates with a pipe C' within the box by an opening $B^2$, as indicated in the drawings so that when the trap hangs vertical, water &c. can pass from pipe s into the trap as indicated. Trunnion b is similarly journaled in a box c on the upper end of the sewer pipe T, the outer end of trunnion being closed. The boxes are hollow but are water and gas tightly connected to the pipes and trunnions, so that the trap can be swung in a horizontal position as indicated in Fig. 3 without leakage at the trunnion joints with the boxes. These boxes may be of any suitable construction, and if desired may be supported on legs or brackets so as to relieve the pipes s and T of the weight of the trap.

V is a vent pipe connecting with the upper end of box c. Trunnion b has two diametrically opposite openings b' in its upper and lower sides which, when the trap is down respectively communicate with pipes V, T, as indicated so as to allow free escape of matter from the trap into pipe T, and of air from the trap or sewer pipe T into the vent pipe. The inner end of trunnion b is connected to a pipe a which is curved down and extends nearly to the bottom of the trap as indicated in the drawings, so that before water &c., entering the trap through trunnion B can escape through trunnion b, it must first descend in the trap and rise through pipe a into trunnion b. By this means water is retained in the trap when the latter is in a vertical position to a point level with the trunnions, and thus an effective water seal is made therein.

When it becomes desirable to clean the trap the plate A' is removed, the trap is then tilted to the position indicated in full lines Fig. 3, and of course all the matters deposited therein are washed out through the opening. Then by simply lowering the trap it can be filled with water through pipe s, raised and emptied, and by repeating this operation the trap can be thoroughly and quickly cleaned without disturbing any of the pipe joints as is evident, and without the necessity of inserting the hand in the trap.

The trunnions are preferably closed at their outer ends by removable screw caps which can be taken off if desired to facilitate the cleansing of the trunnions if it becomes necessary to do so. It will be observed that as the trap is swung to a horizontal position the trunnions rocking in their bearings close the pipe T, and if desired pipe s, also, so that no foul air can enter the room while the trap is being cleansed; the trunnions operating like ordinary cut off cocks which close at the quarter turn. As soon as the trap is let back to horizontal position the communication between the vent and sewer pipes is re-established, and the water seal formed by the first water entering through pipe s and the plate A' can be put on at leisure. This trap can be readily cleansed as described by anyone, and as no joints have to be disturbed the employment of a plumber is unnecessary, and the trap may be cleansed as often as desired without affecting the fittings or the adjustment of parts.

Having described our invention, what we claim as new, and desire to secure by Letters Patent thereon, is—

1. The combination with the waste and sewer pipes of the tilting trap connected with both pipes, and cleansed by tilting the sewer pipe connected to the upper end of trap but communicating with the interior thereof near the bottom, substantially as described.

2. The combination of the waste and sewer pipes, a tilting trap interposed between the same and communicating therewith having an internal depending pipe forming the communication with the sewer pipe, and provided with a cleansing out opening substantially as described by which the contents are removed by tilting the trap, substantially as described.

3. The combination of the waste and sewer pipes with the tilting trap swung between the same and adapted to close communication between the pipes when it is tilted, to empty it, substantially as specified.

4. The combination of the tilting trap having a pair of hollow trunnions an internal depending pipe connected at its upper end with one trunnion, and a cleansing out opening closed by a removable plate with the waste and sewer pipes respectively communicating with said trunnions substantially as described.

5. The combination of the waste and sewer pipes, the boxes connected thereto, the tilting trap suspended between said boxes by hollow trunnions, said trunnions establishing communication between the pipes through the trap when the latter is in a vertical position, and closing communication between the pipes when the trap is raised to a horizontal position, substantially as and for the purpose described.

6. The combination of the tilting trap having hollow trunnions, a lipped opening in its top, a removable plate closing said opening, an interior depending pipe connected to one trunnion, and the waste and sewer pipes communicating with the respective trunnions, substantially as specified.

7. The combination with the waste pipe, the box connected thereto the sewer and vent pipes, the box between the same; with the tilting water seal trap having hollow trunnions journaled in said boxes and establishing communication between the sewer and waste pipes when the trap is vertical, the removable cover in the top of said trap, and the removable pieces closing the ends of said trunnions, substantially as described.

In testimony that we claim the foregoing as our own we affix our signatures in presence of two witnesses.

NICHOLAS BARRY, JR.
PATRICK J. BARRY.

Witnesses:
J. H. BERKSHIRE,
THOS. F. BARRY.